No. 625,674. Patented May 23, 1899.
W. H. HAWKES.
GRAVITY MACHINE.
(Application filed Mar. 11, 1898.)
(No Model.)

WITNESSES:

INVENTOR
W. H. Hawkes
BY
ATTORNEYS.

UNITED STATES PATENT OFFICE.

WILLIAM HENRY HAWKES, OF ANN ARBOR, MICHIGAN.

GRAVITY-MACHINE.

SPECIFICATION forming part of Letters Patent No. 625,674, dated May 23, 1899.

Application filed March 11, 1898. Serial No. 673,497. (No model.)

*To all whom it may concern:*

Be it known that I, WILLIAM HENRY HAWKES, of Ann Arbor, in the county of Washtenaw and State of Michigan, have invented a new and Improved Gravity-Machine, of which the following is a full, clear, and exact description.

The invention relates to machines for measuring the distances of falling bodies; and the object of the invention is to provide a new and improved gravity-machine arranged to measure with great accuracy the respective distances a body falls during successive equal intervals of time to prove experimentally the acceleration due to gravity, at the same time recording the measured distances.

The invention consists of novel features and parts and combinations of the same, as will be described hereinafter and then pointed out in the claims.

Reference is to be had to the accompanying drawings, forming a part of this specification, in which similar characters of reference indicate corresponding parts in all the figures.

Figure 1:
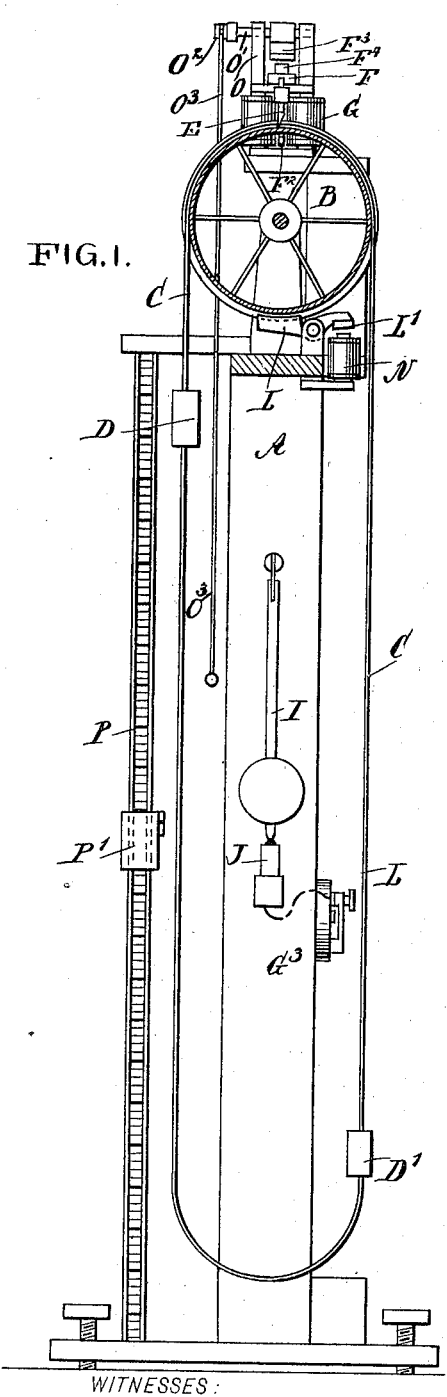
Figure 2:
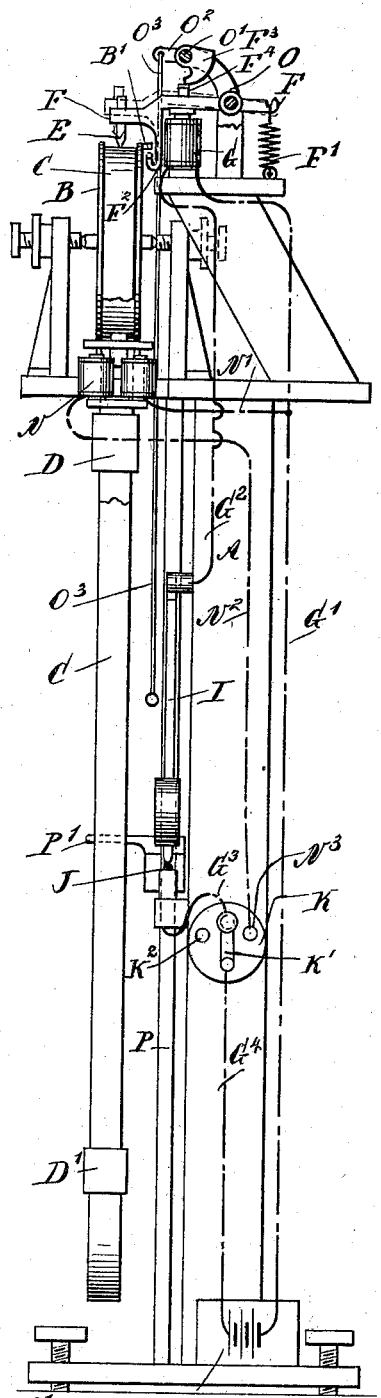
Figure 3:
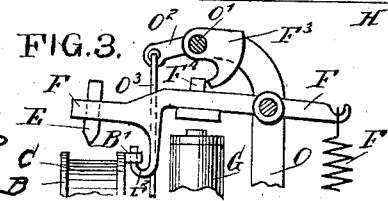

Figure 1 is a front elevation of the improvement with parts in section. Fig. 2 is a side elevation of the same with part broken out; and Fig. 3 is an enlarged side elevation of part of the improvement, showing the pulley locked.

The improved gravity-machine is mounted on a suitably-constructed frame A, in which is journaled a flanged wheel B, over which passes an endless band C, hanging loosely downward from said wheel, one of its runs being provided with a body D and the other run having a counterweight D', somewhat smaller than the body D, to permit the latter to fall when the wheel B is released, as hereinafter more fully described.

On the top of the band C is arranged a pencil or other marker E, adapted to mark on the band C during measured equal intervals of time, said marker being held in the armature-lever F of electromagnets G, carried by the frame A and connected by one wire G' with a battery H or other source of electricity-supply, the other wire $G^2$ being connected with a pendulum I, mounted on the frame A and adapted to make contact when in a vertical position with a mercury-cup J, connected by a wire $G^3$ with a switch K, provided with a switch-lever K', adapted to connect the wire $G^3$ with a wire $G^4$, leading to the other pole of the battery H. Thus when the switch-lever K' is in the position shown in Fig. 2 the circuit is completed between the electromagnets G and the pendulum I whenever the latter makes contact with the mercury-cup J, so that the lever F is attracted by the magnets G and the marker E makes a mark on the band C. When the pendulum swings to one side and breaks the contact at the mercury-cup J, then the circuit is broken and the spring F' on the armature-lever F swings the latter upward and moves the marker E out of engagement with the band C. At the next contact of the pendulum with the mercury-cup the above-described operation is repeated and the armature-lever F is attracted to again cause the pencil E to make a mark on the band C.

In order to hold the wheel B in a locked position until a motion instant and simultaneous with the delivery of the first mark on the band C is required, I provide the following device: Near the front end of the armature-lever F is formed or secured a depending hook $F^2$, adapted to move into the path of a lug or projection B' on the rim of the wheel B, as plainly shown in Fig. 3, to hold the wheel against rotation at the time the forward end of the lever F has lifted the pencil E off the band C under the pull of the spring F'. By this arrangement the wheel B is held in position until the circuit is closed through the pendulum, and as the front end of the lever F then swings downward the hook $F^2$ moves out of engagement with the lug B' at the time the pencil marks or records the starting-point of the falling body simultaneous with the beginning of the movement of the wheel. Thus the recording device and the wheel operate automatically and in conjunction with each other. When the armature-lever F by the action of spring F' moves back toward its previous position on the breaking of the circuit, it is prevented from recovering its full original position by a pivoted gravity-catch $F^3$ engaging a pin $F^4$ on the top of the armature-lever F, near the front end thereof, thus allowing the wheel-lug B' to pass the hook F² at every revolution and yet giving the armature-lever room to vibrate for making the records by its pencil E.

In order to stop the wheel B after the record is made and the band has reached its maximum speed, I provide a brake L, engaging the non-occupied portion of the periphery of said wheel at the under side thereof, as is plainly shown in the drawings, said brake being held on an armature-lever L', adapted to be attracted by a second pair of electromagnets N, connected by one wire N' with the wire G' and by another wire N² with a contact-point N³ on the switch K, so that when the switch-lever K' is moved upon said contact-point N³ then the circuit is completed to the electromagnets N and the latter attract the armature-lever L' to move the brake L in frictional engagement with the wheel B to brake the latter and finally arrest its motion and that of the band C without jar to the machine or rupture of the band containing the record. The switch-lever K' is moved onto a shunt-point K² when the machine is at rest, and then the operator pulls a cord O³, connected with an arm O² on the shaft O', carrying the gravity-catch F³, so that the latter is swung out of engagement with the pin F⁴ to allow the armature-lever F to swing to its full uppermost position to bring the hook F² again into the path of the lug B' to lock the wheel B against further rotation. The lever F is fulcrumed on the bracket O, carried by the frame A, and the shaft O' is journaled in the said bracket.

In close proximity to the run of the band C, carrying the weight D, is arranged a scale P, preferably graduated in millimeters and carrying an adjustable pointer P' to read on said run.

The operation is as follows: When the body D is in an uppermost position, as illustrated in Figs. 1 and 2, and it is desired to record the relative distances the body falls in equal intervals of time, (indicated by the strokes of the pendulum I,) the operator moves the switch-lever K' from the contact-point K² to the wire G³ to establish a circuit through the pendulum and electromagnets G, as previously explained, to attract the armature-lever F, to release wheel B and, cause the first or starting mark to be recorded by the pointer E on the band. The body D now falls, owing to the release of the wheel B, and the marker E marks on the band C at equal intervals of time; but as the band moves with the same speed as the body D falls it is evident that the marks will be distances apart according to the fall of the body. The distance the body D falls during a certain given time is indicated on the graduation P by the pointer P'. Thus it is evident that by the arrangement described it is possible to measure with great accuracy the respective distances a body falls during successive equal intervals of time to prove experimentally the acceleration due to gravity. When it is desired to stop the machine, the operator moves the switch-lever K' first to the contact-point N³ for applying the brake and then moves the switch-lever to the point K² to cut out all the circuits.

Having thus fully described my invention, I claim as new and desire to secure by Letters Patent—

1. A machine for measuring distances of falling bodies provided with a band arranged to travel with the same speed as a falling body, and a movable pointer or marker actuated during successive equal intervals of time to mark the band at distances apart equal to the fall of the said body, substantially as described.

2. A machine for measuring distances of falling bodies, comprising a band mounted to travel and provided with a weight, and a marker actuated at successive equal intervals of time, to mark the band, whereby the band will be marked at distances apart equal to the fall of the body, substantially as described.

3. A machine for measuring distances of falling bodies, comprising an endless band mounted to travel and provided with a weight, a marker actuated at successive equal intervals of time to mark the band, and a scale and pointer arranged adjacent to the run of the band carrying the weight, whereby provision is made for measuring the distances the body falls during successive equal intervals of time, substantially as described.

4. A machine of the class described provided with a band arranged to travel with the speed of the falling body, an electromagnet having its armature-lever arranged for indicating on the said band, and a time-measure in the circuit for the said electromagnet to open and close the said circuit at successive equal intervals of time to cause the armature-lever to mark the band during successive equal intervals of time, substantially as shown and described.

5. A machine of the class described provided with a band arranged to travel with the speed of the falling body, an electromagnet having its armature-lever arranged for indicating on the said band, and a time-measure in the circuit for the said electromagnet to open and close the said circuit at successive equal intervals of time to cause the armature-lever to mark the band during successive equal intervals of time, and a graduated scale and pointer movable thereon to indicate on the said band, substantially as shown and described.

6. A machine of the class described comprising a pulley, a band passing over the said pulley and suspended therefrom, a body on the said band, a marker or pointer for marking on the band, an electromagnet having its armature-lever carrying the said pointer, and a pendulum in the circuit for the said electromagnet and adapted to close the circuit momentarily to cause the electromagnet to attract its armature-lever for the pointer to mark the band, substantially as shown and described.

7. A machine of the class described comprising a pulley, a band passing over the said pulley and suspended therefrom, a body on the said band, a marker or pointer for marking on the band, an electromagnet having its armature-lever carrying the said pointer, and a pendulum in the circuit for the said electromagnet and adapted to close the circuit momentarily to cause the electromagnet to attract its armature-lever for the pointer to mark the band, and a locking device for limiting the return motion of the said armature-lever, substantially as shown and described.

8. A machine of the class described comprising a pulley, a band passing over the said pulley and suspended therefrom, a body on the said band, a marker or pointer for marking on the band, an electromagnet having its armature-lever carrying the said pointer, and a pendulum in the circuit for the said electromagnet and adapted to close the circuit momentarily to cause the electromagnet to attract its armature-lever for the pointer to mark the band, a brake for the said wheel, second electromagnet for controlling the brake, and a switch in the circuits for the said electromagnets, substantially as shown and described.

WILLIAM HENRY HAWKES.

Witnesses:
HORATIO N. CHUTE,
MARTIN J. CAVANAUGH.